F. C. AREY
MACHINE FOR MAKING RIBBED EXPANDED METAL.
APPLICATION FILED DEC. 21, 1917.
1,318,953.
Patented Oct. 14, 1919.
4 SHEETS—SHEET 1.
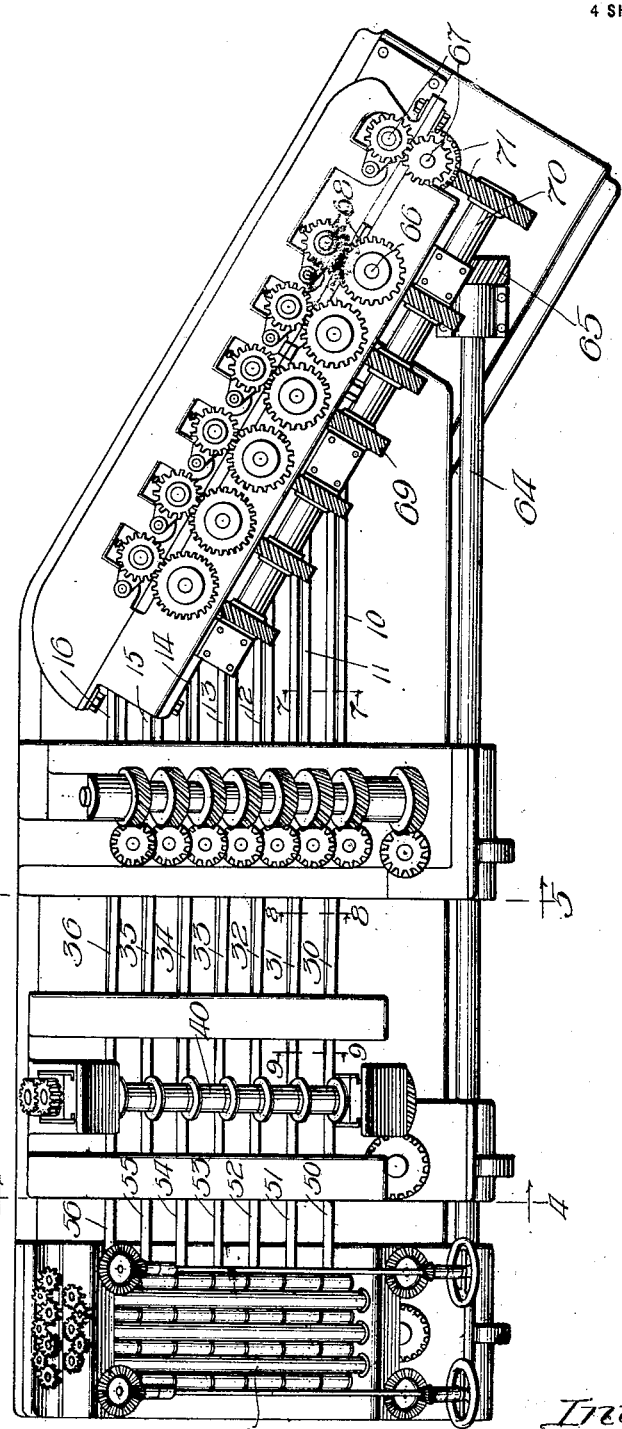

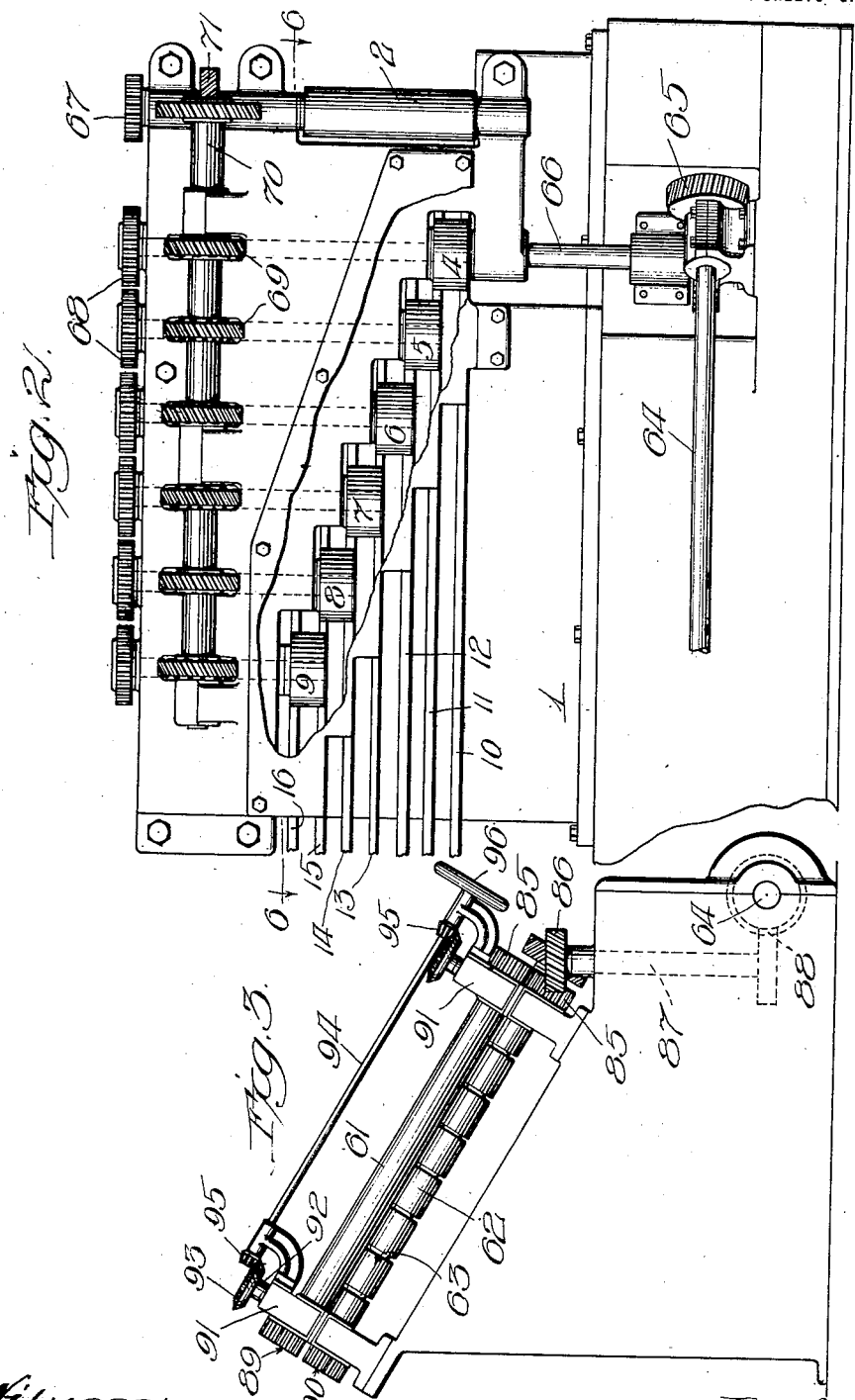

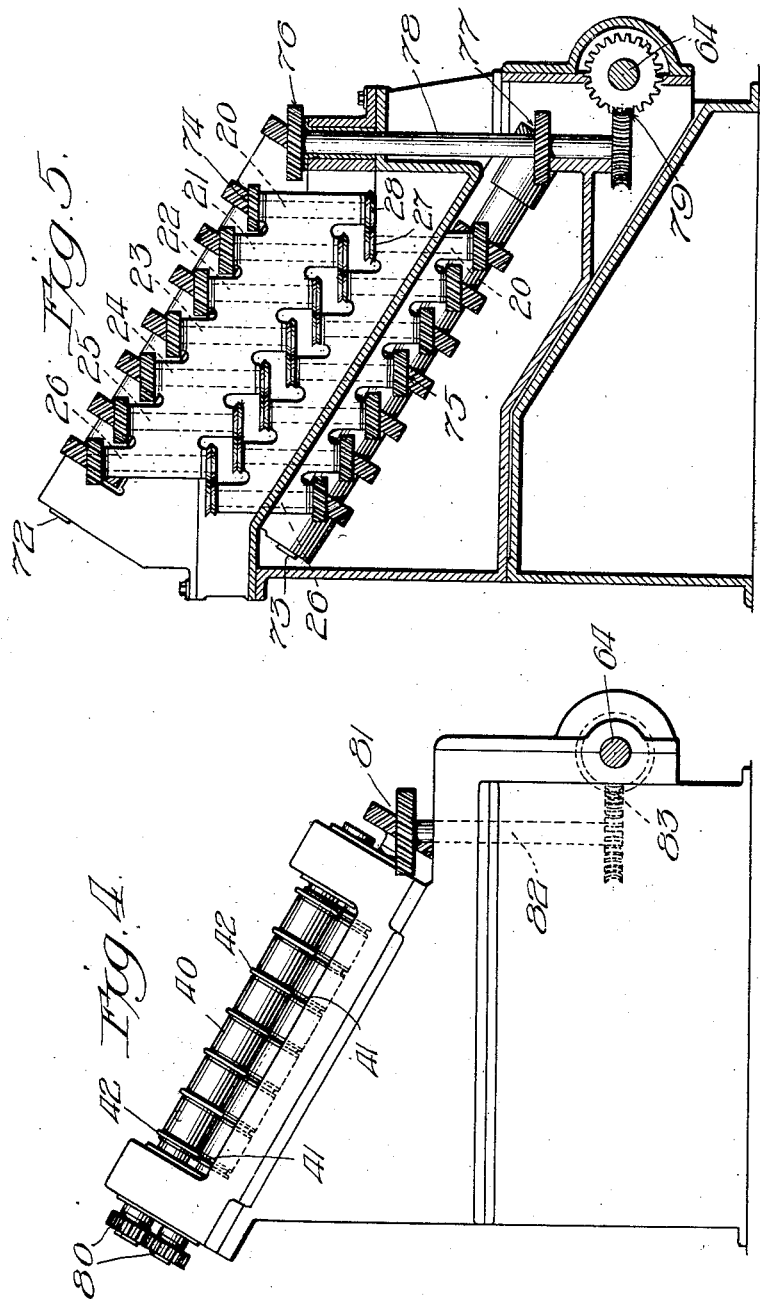

F. C. AREY.
MACHINE FOR MAKING RIBBED EXPANDED METAL.
APPLICATION FILED DEC. 21, 1917.
1,318,953.
Patented Oct. 14, 1919.
4 SHEETS—SHEET 4.
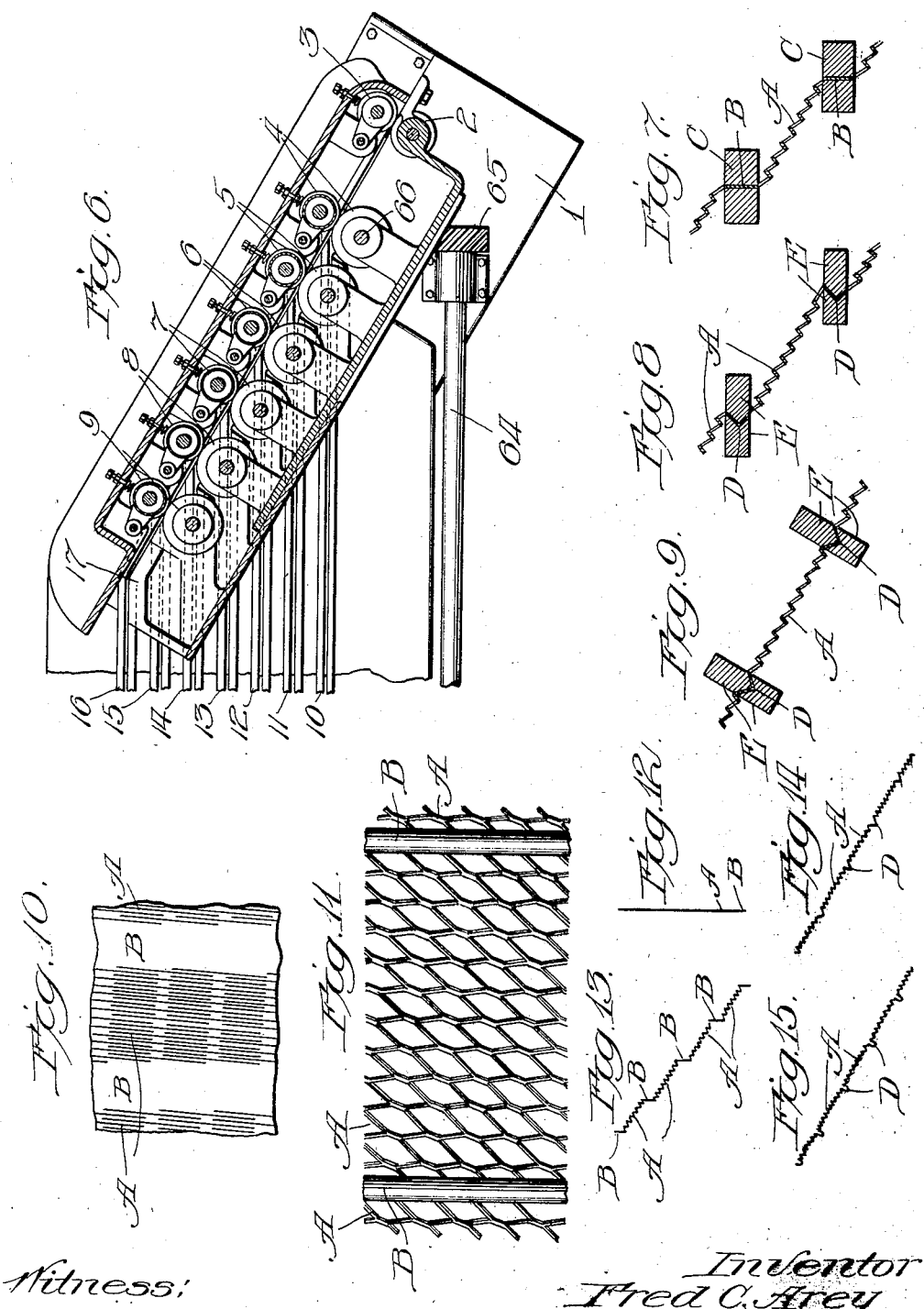

UNITED STATES PATENT OFFICE.

FRED C. AREY, OF OAK PARK, ILLINOIS, ASSIGNOR TO EDGAR AMES TURNER, OF CHICAGO, ILLINOIS.

MACHINE FOR MAKING RIBBED EXPANDED METAL.

1,318,953.  Specification of Letters Patent.  Patented Oct. 14, 1919.

Application filed December 21, 1917. Serial No. 208,211.

*To all whom it may concern:*

Be it known that I, FRED C. AREY, a citizen of the United States, residing at Oak Park, county of Cook, State of Illinois, have invented a certain new and useful Improvement in Machines for Making Ribbed Expanded Metal, and declare the following to be a full, clear, and exact description of the same, such as will enable others skilled in the art to which it pertains to make and use the same, reference being had to the accompanying drawings, which form a part of this specification.

My invention has for its object to produce a simple, powerful and efficient machine for effectively and economically expanding a metal sheet containing slitted panels separated by unslitted portions and form ribs in such unslitted portions.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a top plan view of a machine arranged in accordance with a preferred form of my invention;

Fig. 2 is a side elevation of the right hand end of the machine, on a slightly larger scale than Fig. 1, a part of the frame being broken away to show normally concealed members;

Fig. 3 is an end view, looking toward the right from the left hand end of Fig. 1;

Fig. 4 is a section taken approximately on line 4—4 of Fig. 1;

Fig. 5 is a section taken approximately on line 5—5 of Fig. 1;

Fig. 6 is a section taken approximately on line 6—6 of Fig. 2;

Figs. 7, 8 and 9 are sections taken approximately on lines 7—7, 8—8 and 9—9 of Fig. 1;

Fig. 10 is a plan view of a fragment of a sheet ready to be fed into the machine to be expanded;

Fig. 11 is a plan view of a fragment of finished expanded metal; and

Figs. 12 to 15 inclusive are diagrammatic or edge views of the sheet, showing various stages in the process from the time the work is fed into the machine until it leaves the machine.

Referring to the drawings, 1 represents a frame suitably constructed to support the mechanisms to be hereinafter described. At one end of the frame are arranged two vertical rolls, 2, yieldingly engaging each other and driven in any suitable manner so as to cause them to feed an interposed sheet into the machine. The rolls 2, which constitute feed rolls, may be of any desired length, being preferably as long as the width of the widest sheet that is to be expanded.

Arranged in a row in the rear of the feed rolls are a series of coöperating sets of rolls the number of which depends upon the number of panels in the widest sheet that is to be expanded. In the arrangement shown, there are six of these sets of rolls, numbered consecutively from 4 to 9. The rolls of each set are yieldingly held together and they are driven so as to have the same peripheral speeds as the feed rolls 2. Furthermore, the entire series of rolls is set on a diagonal to the longitudinal axis of the machine. The rolls 4 to 9 are comparatively short and they are arranged in a series of steps, the rolls 4 being the lowermost and the rolls 9 being at the top; and the arrangement being such that each set of rolls extends up a short distance above the planes of the lower ends of the next set in the series.

The material on which the machine is to operate, as best shown in Fig. 10, consists of long narrow metal sheets provided with longitudinally extending slitted panels, A, separated by unslitted panels or strips, B. The slits in the panels are of the usual type employed for the purpose of making expanded metal having a diamond mesh and they are placed so that they make a small angle with the longitudinal axes of the sheets. This arrangement permits a sheet to be expanded without stretching the strands by the simple operation of stretching the sheet in a direction to widen it. The finished product is shown in Fig. 11 wherein the slitted panels have been expanded into diamond mesh and the unslitted portions have been formed into longitudinally extending channels or ribs.

Each of the sets of rolls 4 to 9, which I shall refer to as the expanding rolls, possesses a length greater than the width of one of the slitted panels, preferably equal to the width of one of the slitted panels and two adjacent unslitted panels or strips. Thus, by reason of the fact that the expanding rolls are arranged at different elevations, when a piece of work is fed between them, each slitted panel is grasped by one or another set of expanding rolls; the lowermost panel being gripped between the rolls 4, the next panel between the rolls 5, and so on.

Extending longitudinally of the machine are parallel horizontal guides numbered consecutively from 10 to 16. Each of the guides consists simply of a pair of rails, C, C, as indicated in Fig. 7, spaced apart a distance approximately equal to the thickness of the metal of which the sheet is made. The guide 10 lies just behind the lowermost ends of the rolls 4 and the guides 11 to 15, inclusive, lie behind the lowermost ends of the rolls 5 to 9 respectively; while the guide 16 lies in a position which would bring it behind the lower end of an additional set of rolls if there were such an additional set in the series. Each guide extends forwardly far enough to be in position to receive the work as it emerges from between the corresponding rolls. Since each guide has a vertical depth corresponding to the width of one of the unslitted sections of the work, it will be seen that as the sheet is fed through the machine the lowermost portion of the sheet, that is the unslitted section at one of the side edges of the sheet, is received by the guide 10 just as soon as it emerges from between the rolls 4. Since all of the guides are arranged at an angle to the plane at which the sheet is fed to the expanding rolls, the lowermost guide will cause the unslitted panel moving along the same to be drawn laterally out of the plane of the sheet which is fed forward until the second unslitted strip or panel and the second slitted panel are gripped between the rolls 5. In other words, the lowermost unslitted strip must swing around out of the plane of the sheet while the second unslitted strip from the bottom remains in the plane of the sheet. The result is that the first slitted panel must expand in order to permit the deflection brought about by the guide 10. The amount of deflection depends upon the angle which the row of expanding rolls makes with the guides; and this angle is so chosen that while the sheet is traveling from the rolls 4 to the rolls 5 the lowermost slitted panel will be fully expanded. The second set of rolls of the series, namely the rolls 5, deliver the second unslitted strip or panel of the sheet to the guide 11 so that it in turn is deflected out of the normal plane of the sheet and the second slitted panel must expand in order to permit the third unslitted panel or strip to enter between the rolls of the set 6. Since the guide 16 does not have a set of expanding rolls of its own, it is provided at its front end with a section, 17, which extends in the line of the feed of the work through the expanding rolls into the vicinity of the upper ends of the rolls 9. The two top unslitted panels or strips are therefore fed simultaneously between the guides 15 and 16. Assuming that Fig. 12 represents an edge view of the sheet as it enters the machine, Fig. 13 is a similar view of the sheet as it leaves the guides 10 to 16; the sheet being fully expanded but the unslitted panels lying almost at right angles to the expanded panels. To make the finished product the unslitted strips or panels must be shaped into ribs and the entire sheet flattened.

Just behind the guides 10 to 16 are rotary dies whose purpose it is to press the unslitted portions of the work into rudimentary channels. In the arrangement shown, there are seven sets of these dies, mounted on pairs of shafts numbered consecutively from 20 to 26. Each pair of shafts comprise an upper shaft and a lower shaft, arranged vertically, placed one beside the other, and overlapping for a short distance at their ends. The upper end of the lower shaft of each pair, as best shown in Fig. 5, has a head provided with a V-shaped groove, 27, extending around the same, while the lower end of the upper shaft has a head provided with a V-shaped annular enlargement, 28, fitting into the groove, 27. Each pair of grooved heads constitutes a set of rotary dies. The dies are arranged in step formation corresponding to that of the guides 10 to 16, and the relation of the parts is such that each of the guides terminates at the entrance to the corresponding set of dies. The members of each set of dies being properly driven in opposite directions, it will be seen that as the work is fed along the guides 10 to 16, each unslitted section, as it leaves the corresponding guide, enters between one of the sets of rotary dies where it is rolled into a V-shape as indicated at D in Fig. 8.

On leaving the rotary dies, the partially shaped ribs, into which the unslitted sections or panels have been formed, are received by guides numbered consecutively 30 to 36. These guides are similar to the guides 10 to 16 in that they comprise two members, E, E, arranged side by side, as best shown in Fig. 8, but their adjacent faces instead of being flat, are made V-shaped, one being a male member and the other a female member of the proper configuration to fit the rudimentary ribs. While the dies arranged on the shafts 20 to 26 act to press the flat unslitted strips or panels into V-shaped troughs, they do not change the general disposition of the parts and consequently the sheet remains as shown in Fig. 8, each expanded panel lying out of the planes of the adjacent panels. The guides 30 to 36 are therefore given a gradual twist from one end to the other so that the rudimentary ribs are twisted around and the sheet brought into an approximately flat condition before it leaves these guides. Figs. 9 and 14 show the condition of the sheet just before it leaves the guides 30 to 36 and a comparison between Figs. 8 and 9 shows the amount of twist that the guides have.

From the guides 30 to 36 the work passes between a pair of finishing rolls, 40, one of which is provided with a series of U-shaped annular grooves, 41, while the other has a series of U-shaped annular ribs, 42, which fit into the grooves. The grooves on the one roll and the ribs on the other are spaced apart from each other a distance equal to the longitudinal center of one rudimentary rib in the work to an adjacent rudimentary rib. Therefore, as the work leaves the guides 30 to 36 and passes through the rolls 40, the ribs are given their final shapes, leaving the work in the condition shown in Fig. 15.

From the rolls 40 the work passes to suitable guides numbered consecutively from 50 to 56 which guide the work to a battery of rolls, 60, which act to flatten the sheet and give it a set, so as to remove any tendency that it may have to twist. The straightening rolls, as best shown in Fig. 3, comprise a series of smooth rolls, 61, coöperating with rolls 62, having therein annular grooves, 63, large enough to receive the ribs on the completed sheet and thus permit the sheet to be fed through the rolls without damaging the ribs. The rolls 61 are preferably staggered relatively to the rolls 62, so that the path through the series may be given any desired sinuosity and consequently adjustment may be made to suit the conditions, some work requiring more straightening than is necessary in the case of other work.

All of the various rolls that I have described may be driven in any suitable or convenient manner. In the arrangement shown, there is a main shaft, 64, extending along one side of the machine. From this shaft is driven, by spiral gears, 65, a vertical shaft, 66, on which is mounted one member of the set of expanding rolls 4. Spur gears, 67, connect together the two rolls of each set of expanding rolls. The two feed rolls are connected together by spur gears, 68. A horizontal shaft 70, extends past the shafts on which are mounted the expansion rolls and past the two feed rolls. Spiral gears, 71, between the shafts 66 and 70 and between the latter shaft, the shaft of one member of each set of the expanding rolls 5—9 and one of the feed rolls cause the feed rolls and the expanding rolls to be rotated when the main shaft is set in motion. Shafts, 72 and 73, extend transversely of the upper and lower shafts 20 to 26, and are connected thereto by spiral gears, 74 and 75. The shafts 72 and 73 are driven by spiral gears, 76 and 77, respectively, carried by a shaft, 78, which is in turn driven from the main shaft 65 by spiral gears, 79.

The rolls, 40, are connected together by spiral gears, 80. One of the rolls of this group is driven by spiral gears, 81, between it and the shaft 82 which is in turn driven by spiral gears 83 from the main shaft 65.

All of the rolls of the group of straightening rolls are geared together at one end by spur gears, 85. One of the rolls 62 is driven by means of spiral gears, 86, between it and a shaft, 87, driven by means of spiral gears, 88, between it and the main shaft 65. At their opposite ends, the rolls 61 are geared together as indicated at 89 and the rolls 62 are geared together as indicated at 90.

The rolls 61 are supported in a frame, 91, which may be adjusted in a direction at right angles to the axes of the rolls. This may be accomplished in a convenient way by supporting the frame, 91, on screws, 92, which have bevel gears, 93, at their outer ends. The shaft, 94, having pinions, 95, meshing with the gears 93 provided with a hand wheel, 96, is adapted to turn the screws and thus shift the rolls 61 so as to vary the distance between the plane of their axes and the plane of the axes of the companion rolls, 62.

It will of course be understood that the various structural details which I have illustrated and described are, in the main, simply those which are incidental to one particular organization embodying my invention. Thus, for example, I have shown and described a series of sets of short expanding rolls each terminating a short distance above the lower ends of the rolls of the next set. As a matter of fact, the length of these rolls may be varied greatly as the important thing is that the rolls of each set project downwardly a definite distance below the lower ends of the rolls of the next set. I therefore do not desire to be limited to specific structural details but intend to cover all forms and arrangements which come within the definitions of my invention constituting the appended claims.

I claim:

1. In a machine for expanding sheet metal comprising slitted panels alternating with unslitted panels, means for feeding a sheet, and means for engaging the unslitted panels one after another at different points in the travel of the sheet and deflecting them bodily transversely of the plane of the sheet.

2. In a machine for expanding sheet metal comprising slitted panels alternating with unslitted panels, means for feeding a sheet, and means for engaging the unslitted panels one after the other and carrying them bodily out of the normal plane of the sheet and bringing them into a series of parallel planes spaced apart far enough to cause the slitted panels to be expanded.

3. In a machine for expanding sheet metal comprising slitted panels alternating with unslitted panels, means for feeding a sheet, and means for engaging the unslitted panels one after the other at different points in the travel of the sheet and deflecting them laterally so as progressively to swing the sheet around a longitudinal axis while maintaining the edges of the sheet in parallel planes.

4. In a machine for expanding sheet metal comprising slitted panels alternating with unslitted panels, means for feeding a sheet, means for engaging the unslitted panels one after another at different points in the travel of the sheet and deflecting them bodily transversely of the plane of the sheet, and means for subsequently forming the unslitted panels into ribs projecting out of the plane of the sheet.

5. In a machine for expanding sheet metal comprising slitted panels alternating with unslitted panels, means for feeding a sheet, means for engaging the unslitted panels one after the other and carrying them bodily out of the normal plane of the sheet and bringing them into a series of parallel planes spaced apart far enough to cause the slitted panels to be expanded, means for shaping the unslitted panels into rudimentary ribs, means for twisting said rudimentary ribs approximately into the plane of the expanded sheet as a whole, and means for completing the shaping of the ribs.

6. In a machine of the character described, a series of sets of coöperating rolls arranged in a row one behind the other, each set of rolls projecting beyond the ends of the next succeeding set on one side of the row, and a series of guides arranged in parallel planes at an angle to the plane containing the axes of corresponding rolls, each guide extending into proximity to the end of the projecting portion of one of the sets of rolls.

7. In a machine for expanding sheet metal comprising slitted panels alternating with unslitted panels, a series of sets of rolls arranged in a row and adapted to feed a sheet along between them, the sets of rolls being arranged in a step formation, the height of the steps being approximately equal to the combined widths of a slitted panel and an unslitted panel, and a guide associated with each set of rolls and constructed and arranged to receive one of the unslitted panels as it passes beyond the plane of the adjacent end of the next succeeding set of rolls and deflect it out of the normal plane of the sheet.

8. In a machine for expanding sheet metal comprising slitted panels alternating with unslitted panels, means for feeding a sheet, and a series of devices for engaging the unslitted panels and deflecting them bodily in a direction transverse to the plane of the sheet, said devices being spaced apart from each other in the direction of travel of the sheet so as to cause said unslitted panels to be acted on successively.

9. In a machine of the character described, a series of parallel guides arranged in step formation, and means for feeding through said guides a sheet containing a series of unslitted panels separated by slitted panels each having a width equal to the height of one of said steps.

10. In a machine of the character described, a series of parallel guides arranged in step formation, and means for feeding through said guides a sheet containing a series of unslitted panels separated by slitted panels each having a width equal to the height of one of said steps, each of said guides comprising a pair of members having complementary working faces changing gradually in contour for the purpose of changing the shape of the unslitted panels.

11. The method of expanding sheet metal comprising slitted panels alternating with unslitted panels, which consists in progressively separating consecutive unslitted panels in a direction transverse to the plane of the sheet, the separation of each consecutive pair of unslitted panels being delayed until a predetermined separation has taken place between one of them and an adjacent unslitted panel.

In testimony whereof I sign this specification.

FRED C. AREY.